T. P. PAYNE.
AGRICULTURAL SYSTEM AND MACHINE.
APPLICATION FILED APR. 20, 1915.
1,195,851.
Patented Aug. 22, 1916.
14 SHEETS—SHEET 7.
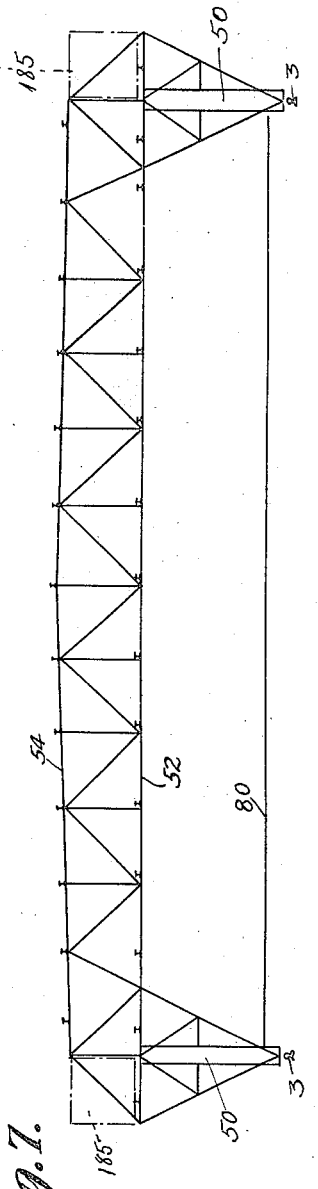
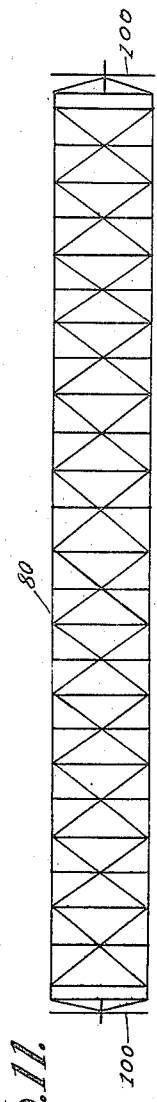
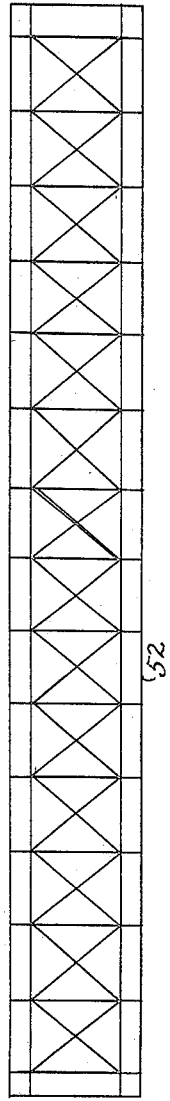
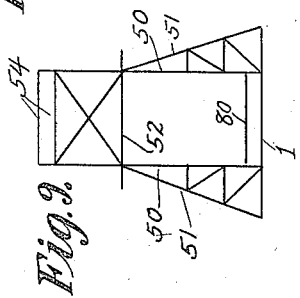
INVENTOR
T. P. Payne
BY
John D. Morgan
ATTORNEY
WITNESSES

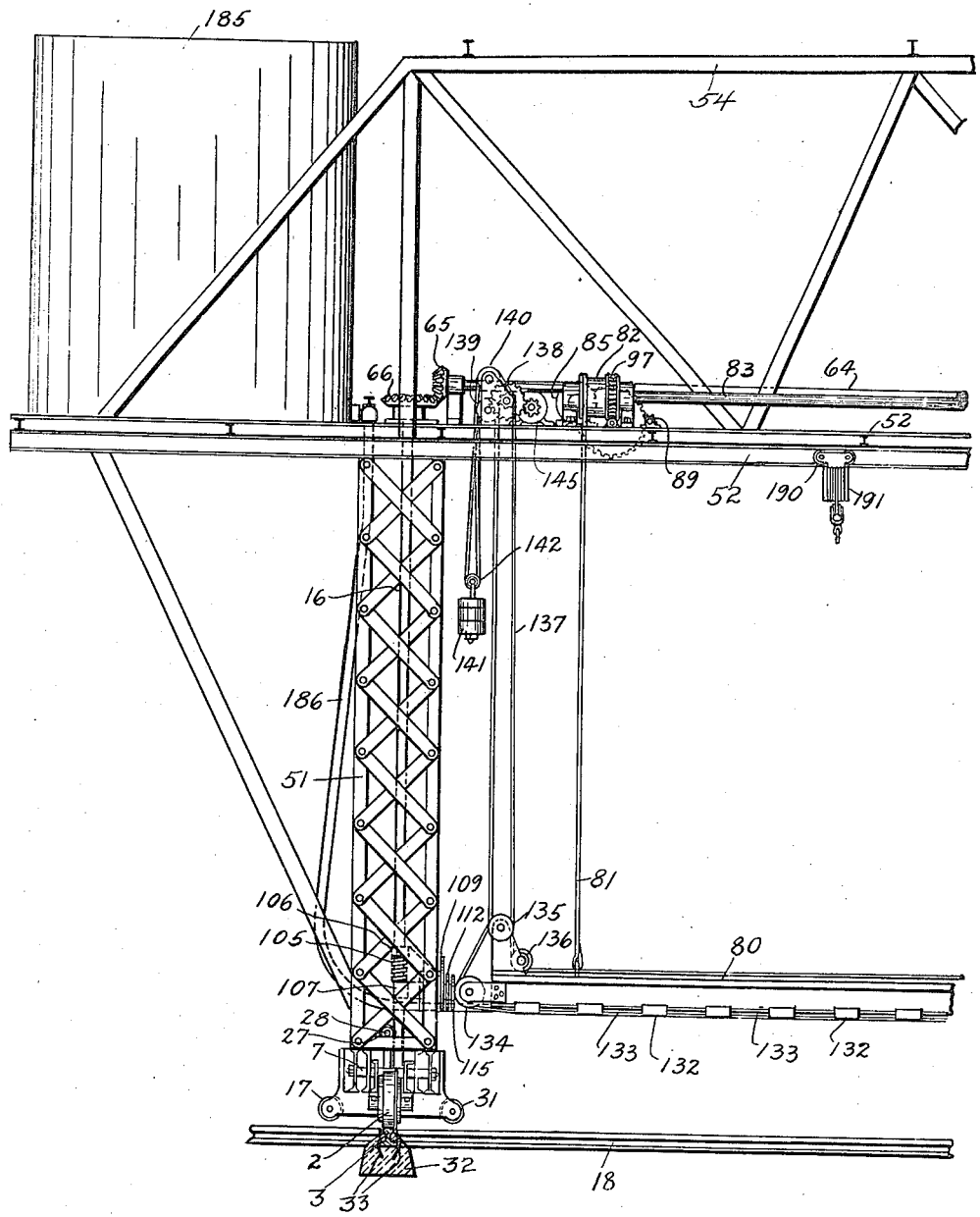

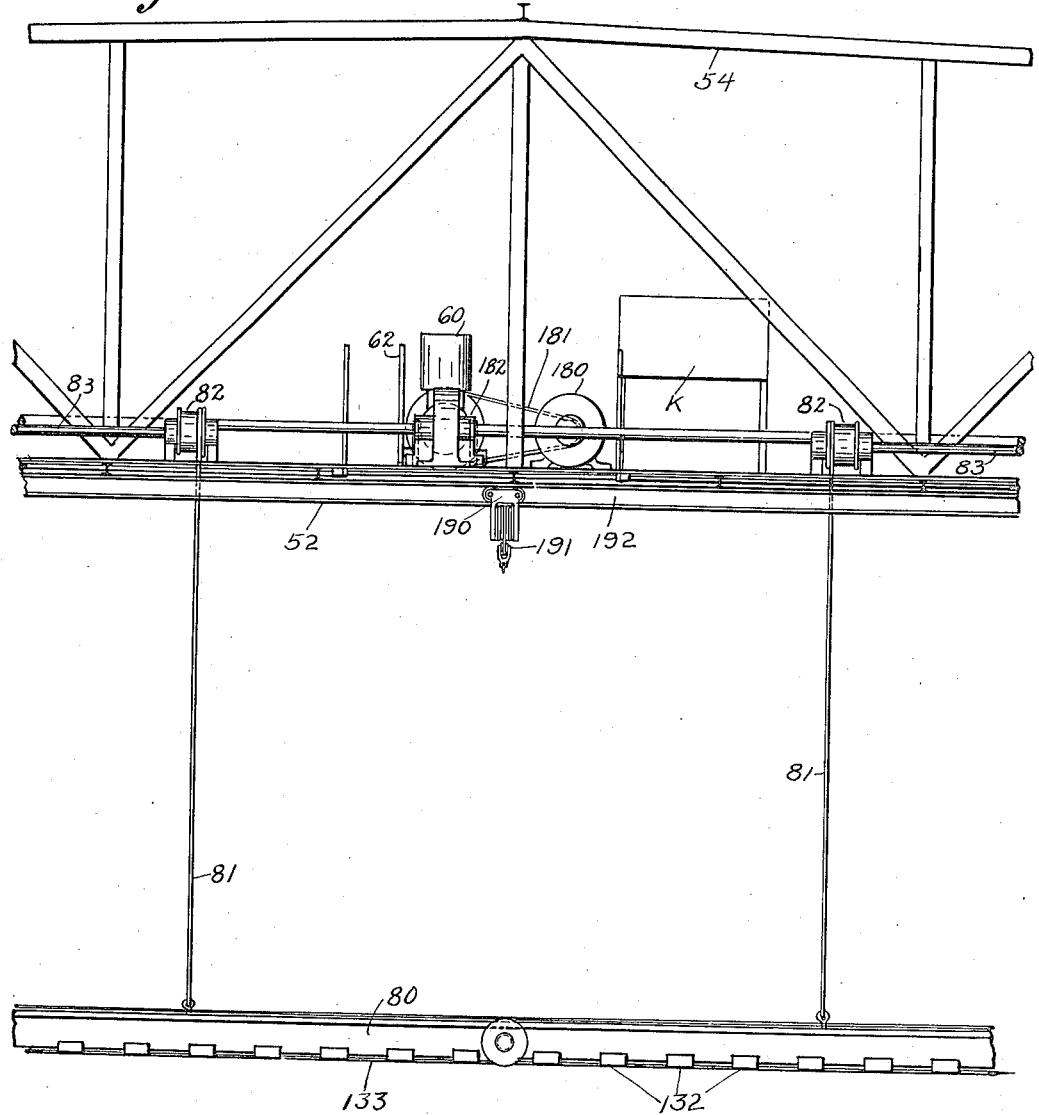

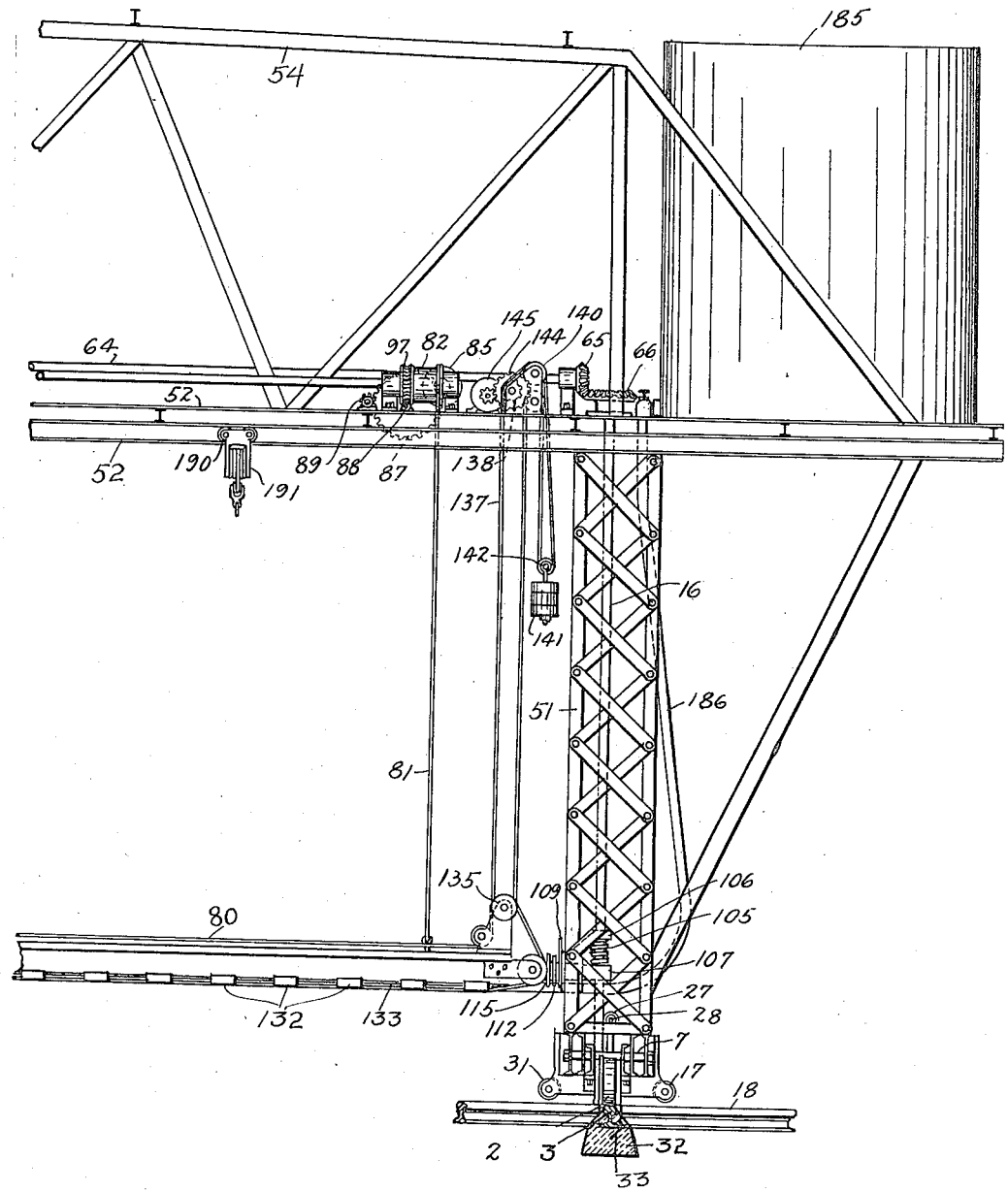

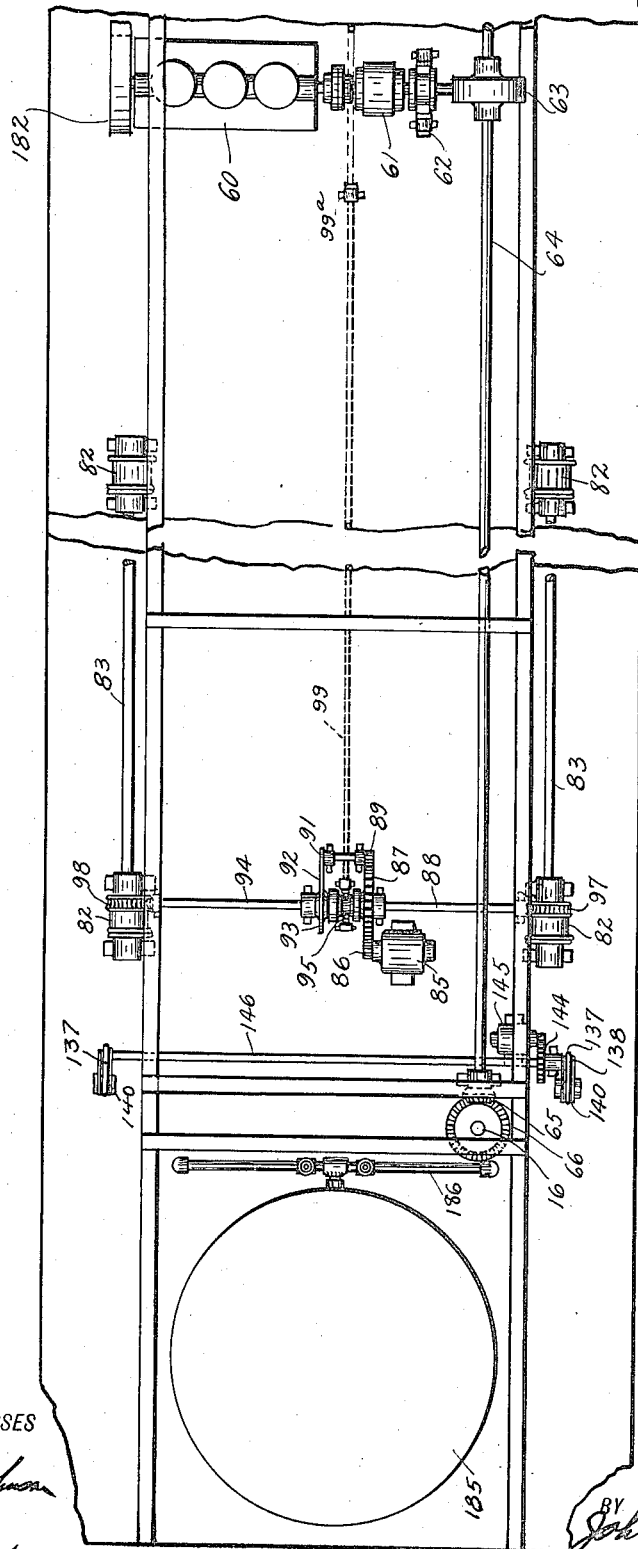

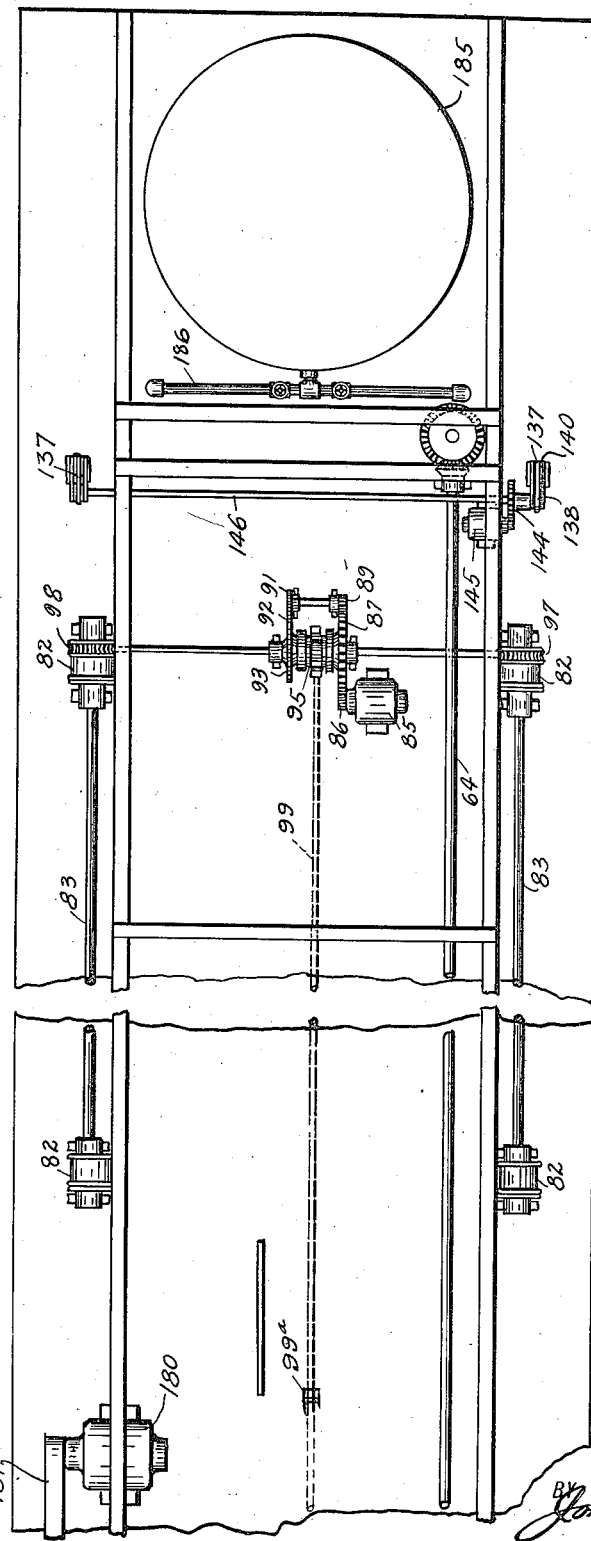

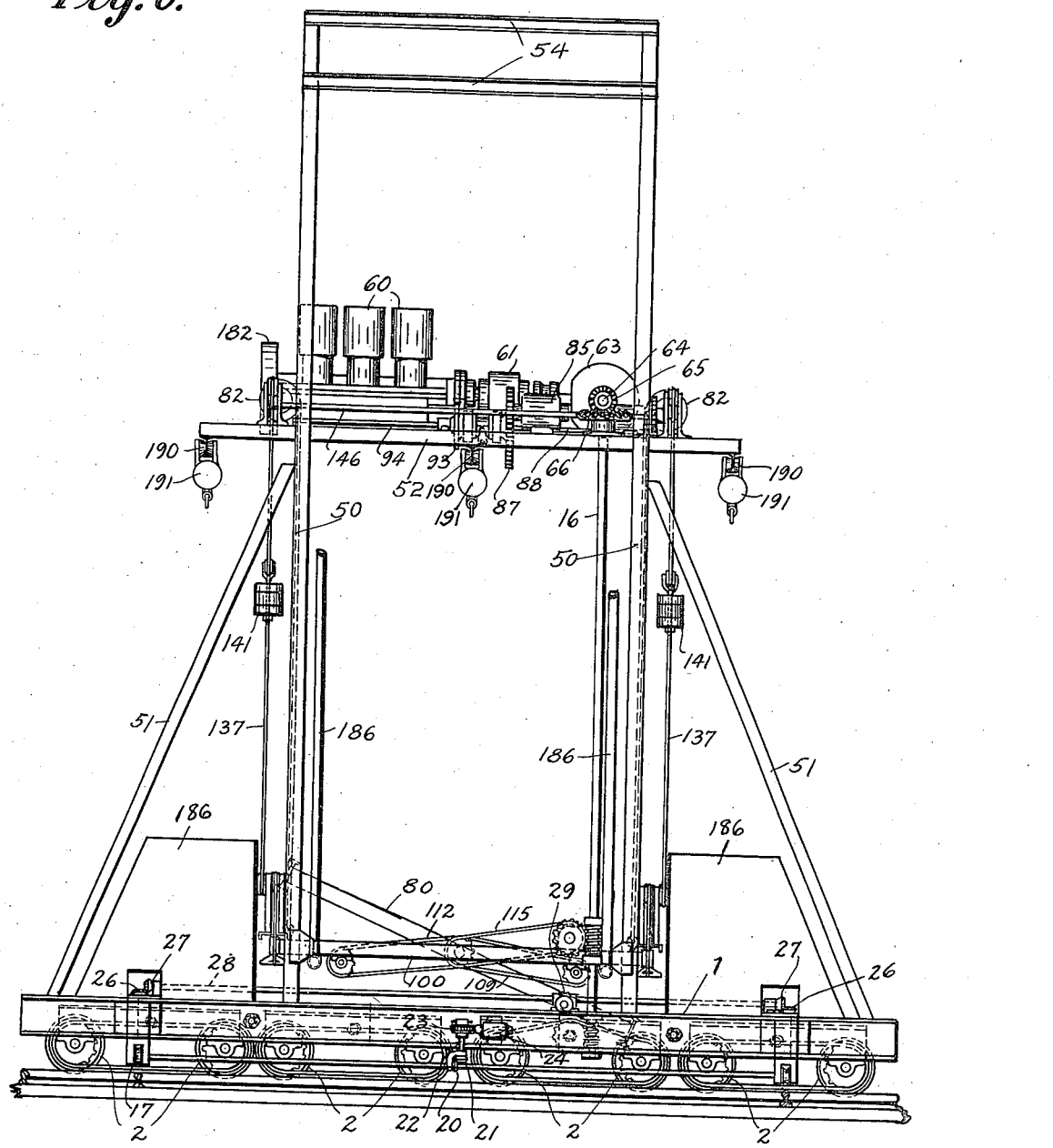

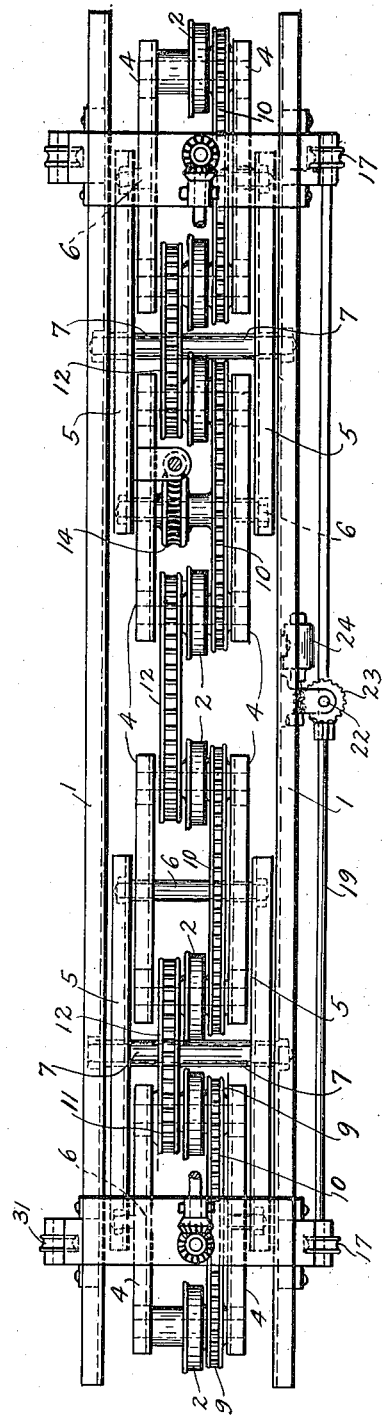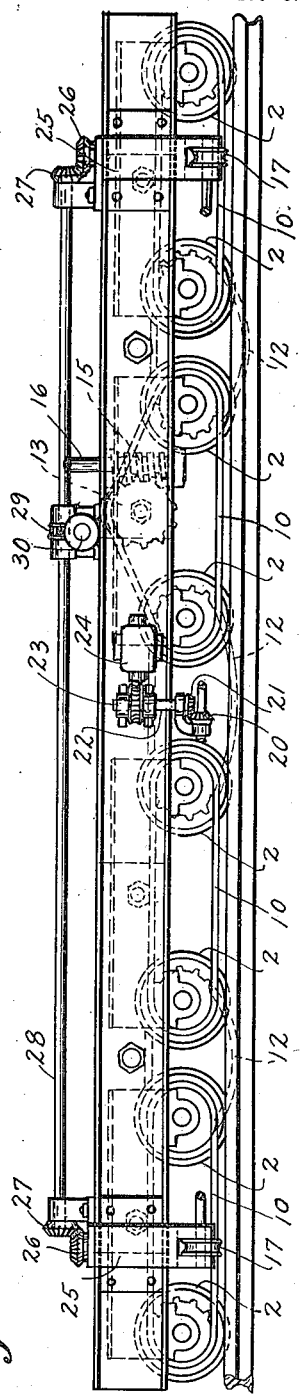

T. P. PAYNE.
AGRICULTURAL SYSTEM AND MACHINE.
APPLICATION FILED APR. 20, 1915.
1,195,851.
Patented Aug. 22, 1916.
14 SHEETS—SHEET 9.
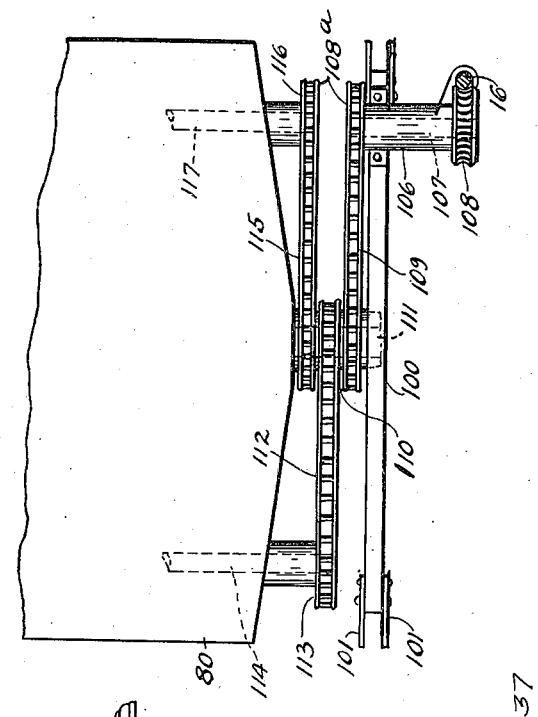
Fig. 16.
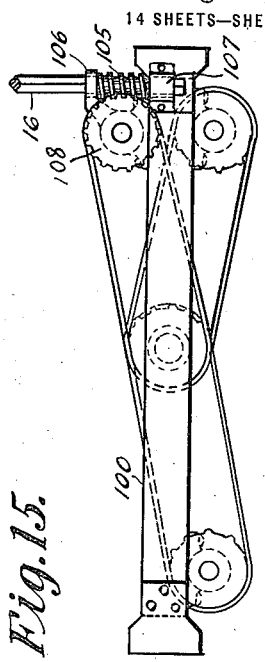
Fig. 15.
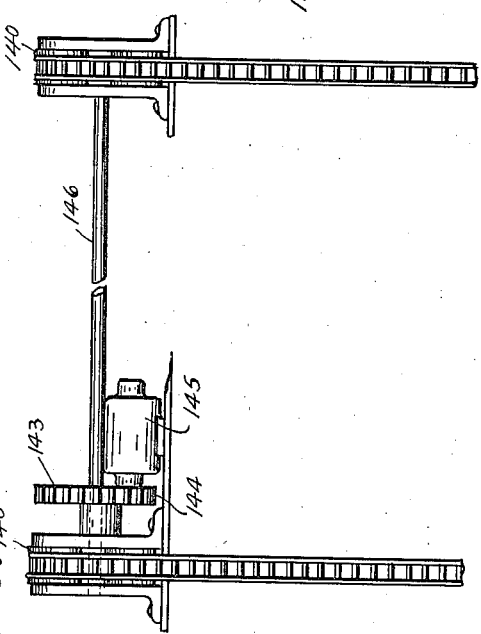
Fig. 14.
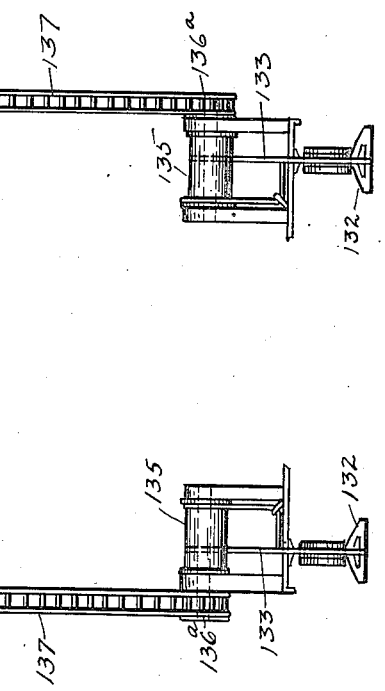
WITNESSES
INVENTOR
T. P. Payne
BY
John D Morgan
ATTORNEY

T. P. PAYNE.
AGRICULTURAL SYSTEM AND MACHINE.
APPLICATION FILED APR. 20, 1915.

1,195,851.

Patented Aug. 22, 1916.
14 SHEETS—SHEET 10.

WITNESSES

INVENTOR
T. P. Payne
BY
John D. Morgan
ATTORNEYS

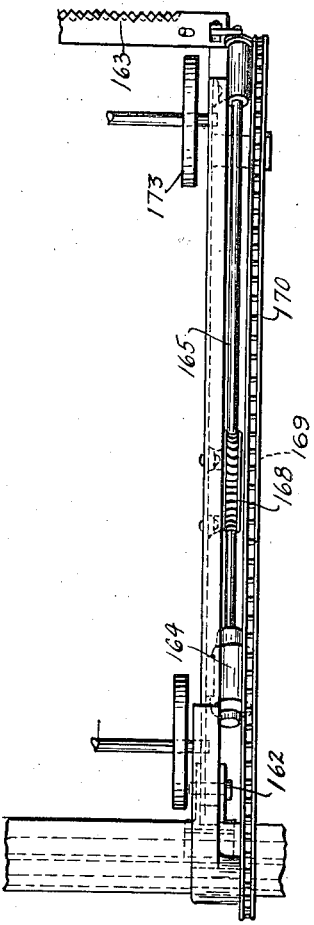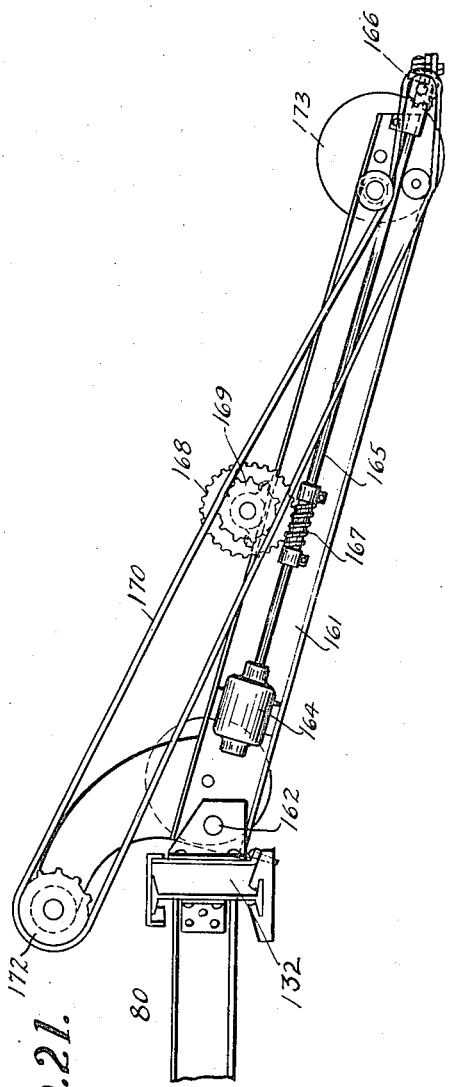

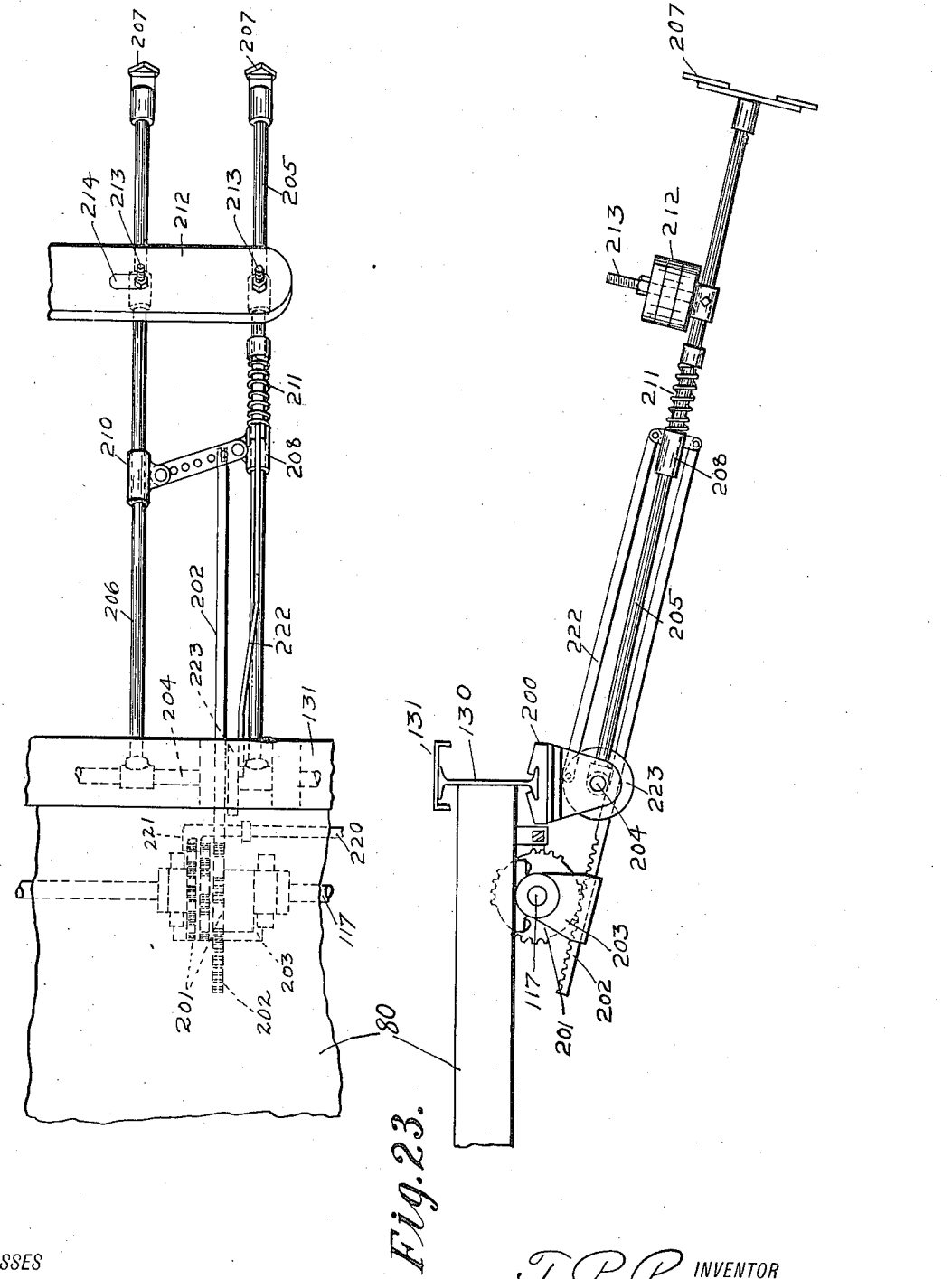

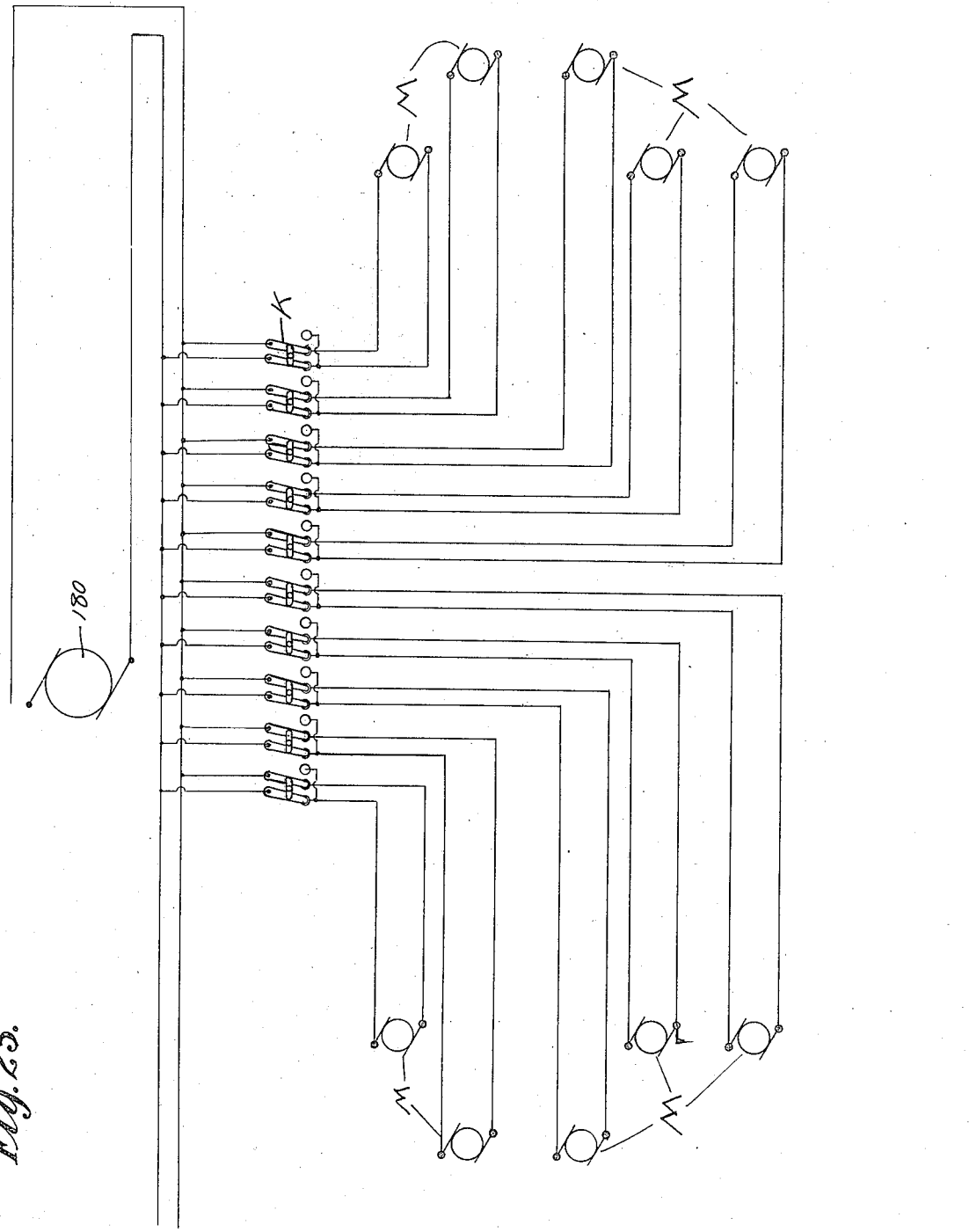

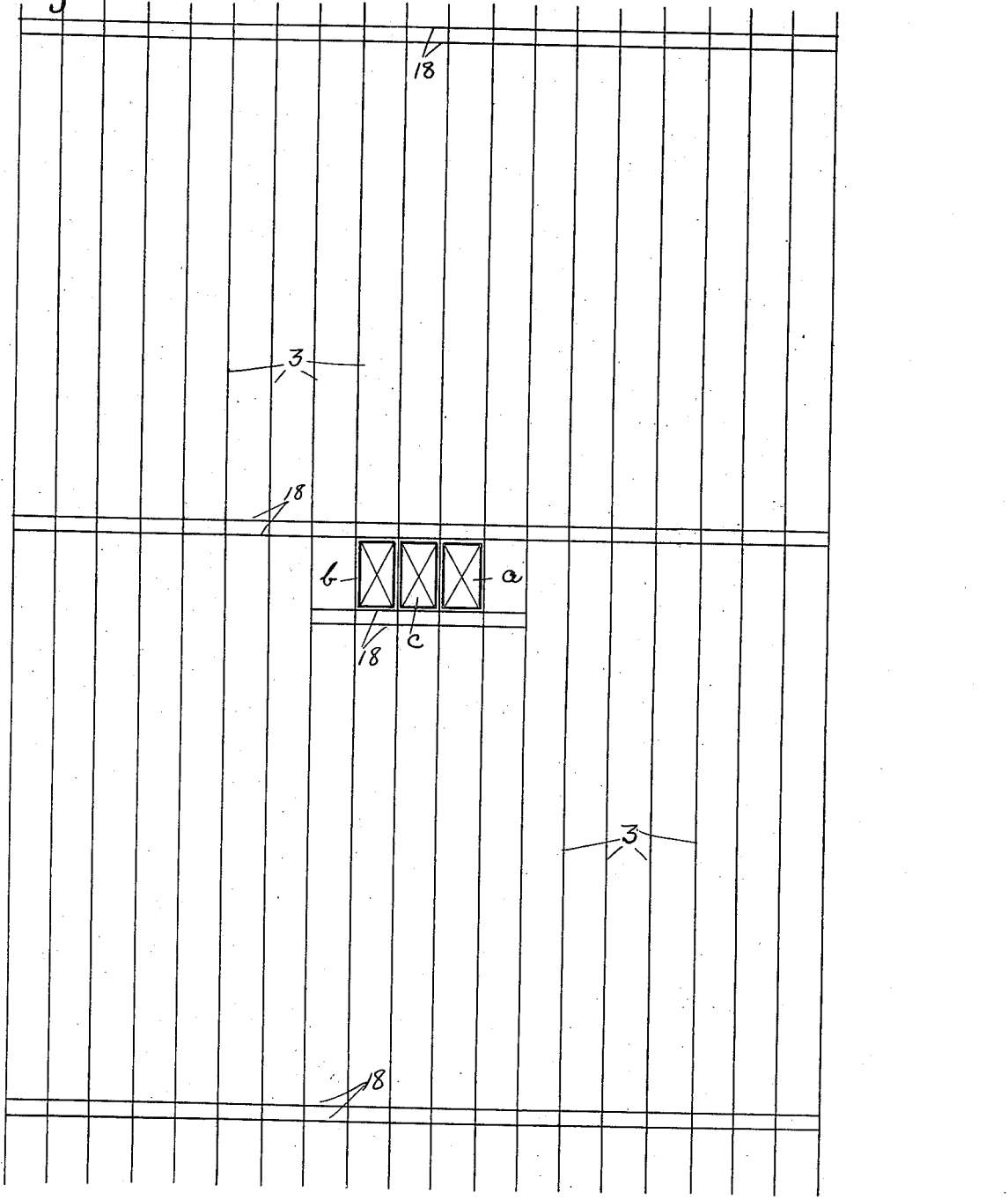

UNITED STATES PATENT OFFICE.

THEODORE P. PAYNE, OF NEWARK, NEW JERSEY.

AGRICULTURAL SYSTEM AND MACHINE.

1,195,851.      Specification of Letters Patent.     Patented Aug. 22, 1916.

Application filed April 20, 1915. Serial No. 22,580.

*To all whom it may concern:*

Be it known that I, THEODORE P. PAYNE, a citizen of the United States, residing at Newark, New Jersey, have made certain Improvements in Agricultural Systems and Machines, of which the following is a specification.

The invention relates to an agricultural system or process, and to apparatus for use in carrying out such process.

The objects and advantages are set forth hereinafter in part, and in part will be obvious herefrom, such objects and advantages being attained through the instrumentalities and combinations set forth in the accompanying claims.

The invention consists in the novel parts, structures, steps, processes, systems, combinations and improvements herein shown and described.

The accompanying drawings, referred to herein and constituting a part hereof, illustrate one embodiment of the invention together with certain steps of the process or system, and together with the description serve to explain the principles of the invention.

Figure 19:
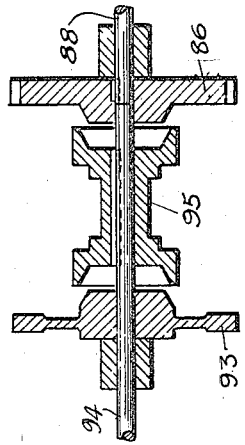
Figure 20:
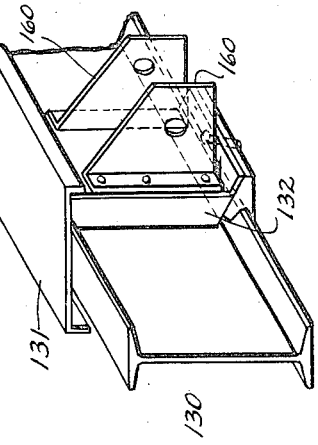
Figure 18:
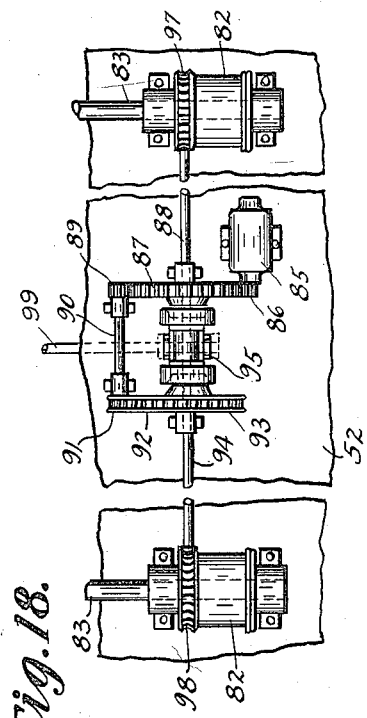
Figure 17:
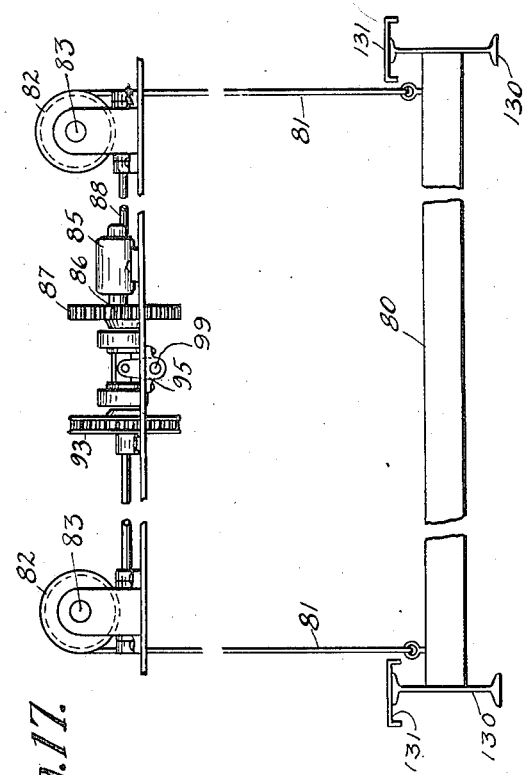

Of the drawings:—Figures 1, 2 and 3 taken together constitute an elevation of the carriage on the tracks, and showing also a portion of its equipment; Figs. 4 and 5 taken together constitute a top plan corresponding to Figs. 1, 2 and 3, with the trussing omitted for the sake of clearness; Fig. 6 is an end view looking at Fig. 1 from the left; Fig. 7 is a line or diagrammatic view showing the complete front elevation of the carriage, corresponding generally to Figs. 1, 2 and 3; Fig. 8 is a similar diagrammatic or line view of a top plan of Fig. 7, and corresponding generally to Figs. 4 and 5; Fig. 9 is a line or diagrammatic view corresponding to Fig. 6, and looking at Fig. 7 from the left; Fig. 10 is a similar view showing the lower horizontal or trussing of the carriage, which is shown in side edge in Fig. 7 and in end edge in Fig. 9; Fig. 11 is a similar view of the suspended platform which is carried by the carriage; Fig. 12 is an enlarged fragmentary section of the lower portion of Fig. 6, showing details of the traction drive; Fig. 13 is a top plan of Fig. 12; Fig. 14 is a fragmentary detail of a portion of the raising and lowering mechanism for the suspended platform; Fig. 15 is a fragmentary view of the transmission and drive for the tillage and other devices with which the suspended platform is equipped; Fig. 16 is a fragmentary top plan corresponding to Fig. 15; Fig. 17 is a fragmentary end elevation of the raising, lowering and tilting mechanism for the suspended platform; Fig. 18 is a fragmentary top plan corresponding to Fig. 17; Fig. 19 is an enlarged sectional detail of the reversible clutch shown near the middle of Figs. 17 and 18; Fig. 20 is an enlarged detail, in perspective, of a connection and support for tillage and other implements; Fig. 21 is a fragmentary elevation showing the attachment and operation of mowing, reaping and like devices; Fig. 22 is a fragmentary top plan corresponding to Fig. 21; Fig. 23 is a similar view to Fig. 21 but showing a part of a cultivator mechanism; Fig. 24 is a fragmentary top plan corresponding to Fig. 23; Fig. 25 is a wiring diagram adapted to be used with the machine; and Fig. 26 is a diagrammatic plan showing the system applied to a tract of tillable land, and including buildings and cross tracks.

By the present invention a tract of tillable ground, and economically a relatively large tract is preferable, is divided up into a plurality of parallel trackways, which trackways include substantially all of the tillable land. Upon the trackways is adapted to travel a structure, which I term for convenience a carriage. The carriage in accordance with certain features of the invention is self-propelling and preferably travels by traction.

In practical operation I deem it preferable to provide the trackway with a gage of about one hundred and sixty feet on rolling ground and of about two hundred feet on level ground, although the particular dimensions are immaterial so far as concerns many features of the invention. The various lines of rail comprised in the various trackways, with the exception of the outermost line of rail at either side, serves to constitute a trackway both with the line of rail at the other side, as will be well understood.

The carriage, as I have chosen to term it, is preferably a trussed steel frame, of gauntree type, and having a series or group of wheels running upon each of two adjacent tracks, the carriage extending upward above each track and spanning the distance or reach between the tracks.

The traveling carriage is constructed and arranged to perform all the work and upon the land incident to the preparation of the land, the sowing, cultivating, and otherwise treating thereof, and the harvesting of the crops, including the transportation of fertilizer out upon the land and transportation of seeds and plants out over the land, the sowing or planting thereof, and the transportation of the harvested crops into the storage buildings, as will be exemplified and explained more in detail hereinafter.

In accordance with certain features of the invention, cross trackways are provided whereby the machine will transfer itself expeditiously from any trackway to any other trackway, by its own power, and without the employment of other or additional mechanism or apparatus.

In certain aspects of the invention, the arrangement or layout of the tract of land comprises buildings or other storage structures in operative relation with respect to the trackways whereby the carriage may receive loads therefrom to be transported over the land or may bring in from the land loads to be deposited within the buildings.

In certain aspects of the invention, the buildings are of such height that the carriage structure will pass thereover, the load from the carriage being deposited within the buildings by gravity, and any loads from the building being lifted directly upward by or to the carriage.

The new agricultural system included in my invention comprises among its features:—railroad tracking the farm, the tracks being usually of from one hundred sixty feet to two hundred feet gage, the greater width being for more level land; an agricultural machine operating on these tracks adapted, with its equipment, to perform all the farm work requiring power, and farm transportation, and thereby to eliminate entirely draft animals or other sources of power for the farm operations; a system, machine and equipment adapted to eliminate about ninety-five per cent. of the usual farm labor required; a system, machine and equipment adapted to large output per small time unit; a system, machine and equipment adapted to both the most intensive type of farming, such as is only done by all hand cultivation at present, and as well to general farming, stock raising, horticulture, etc.; a system, machine and equipment adapted to the simple and systematic operation of large units, of such size that the business can be organized for its highest efficiency in both production and marketing of the production, and being of size sufficient to employ profitably its own farm expert or experts; and of size to merchandise or wholesale its own products in the most profitable manner. With my system, this may be done on a farm capital which is very much less than the capital required under present practice for a farm of equal production.

More particularly, and having in mind certain specific features of the present illustrated embodiment, to which the invention in its broader features is not confined, a machine embodying the invention comprises a traveling structure of gauntree type, arranged to operate under its own power on wheels running on tracks, preferably of wide gage; a platform, preferably of trussed construction, suspended from the gauntree structure, and arranged to be tilled and also to travel vertically, and being pivoted to cross heads operating in up and down guides in the vertical portions of the gauntree structure; said platform being also arranged to be revolved or tipped to any desired degree of inclination (depending on the proportioning of the machine and the height of the platform) around the above mentioned pivots in either direction, this operation being independent of the above mentioned vertical travel; a suspended platform arranged to carry or transport loads and also arranged to provide for drawbar or pushbar loads in a lateral direction due to the operation of pulling or pushing loads or equipment, such as agricultural implements; a suspended platform, preferably of trussed construction, provided with sliding members on either chord arranged to be operated from the operating station of the traveling structure, said sliding members providing means for attachment of, and transmission to the trussed platform, of the various drawbar and pushbar loads, such as various tillage tools and implements, and at the same time providing means for quickly by one-man control resetting the position of such loads and equipment therewith as desired; a suspended platform provided with mechanism arranged to operate in a definite relation to the speed of the traveling structures, said relation being proportioned by means of gear shifts; a system of overhead tracks and hoists mounted on the traveling structure, and operated thereon, providing means for lifting tools, equipment, or other loads in conjunction or otherwise with sliding members for resetting the positions of such tools or equipment or the handling of any desired loads; tanks carried on the upper truss platform, and provided with power mixing or stirring mechanism, providing means in connection with a suitable piping system for pressure spraying; tanks carried on machine wheel frame or bolsters, and arranged with power mixing or stirring mechanism, and providing means in connection with a suitable piping system for watering and for combined watering and fertilizing; storage and transportation bins, carried directly above the wheel frames, thereby minimizing the strain on the machine; a power plant mounted on the traveling structure and transmission suitable for the work desired, and of a structure arranged to suit such power plant and transmission; an electric generator on the traveling structure, and operated by the machine power plant for the operation of independent motors as may be desired and for furnishing light for night work; a detachable boom located over each track, and arranged to be raised or lowered from the outboard end and provided with tracks arranged for sliding members, carriages, or trolleys as may be desired from which may be operated a suitable power trenching tool or tools and also similar arrangements for running or sliding into place the sections of the track to be laid; a machine of the kind described and having the capacities enumerated controlled by one man from the power station.

Other of the general features of the invention will be set forth and described hereinafter in connection with the more detailed description.

Referring more particularly to the drawings, a general front elevation of the machine is seen by placing Figs. 1, 2 and 3 side by side, Fig. 1 showing an edge view of one end frame of the machine with its track, and Fig. 3 showing an edge view of the other end frame of the machine with its track, and these two figures with Fig. 2 placed therebetween showing fragmentarily the cross reach of the structure from one track and end frame to the other track and end frame the greater part of the trussing being omitted for the sake of clearness.

Referring now to Fig. 6, illustrating the embodied form of construction of the end frame, with the trussing likewise omitted for the sake of clearness, there is provided a horizontally arranged frame 1 supported upon the wheels 2, which wheels run upon tracks 3. The wheels 2 are preferably double flanged. The wheels 2 are mounted in pairs in bolsters 4, which bolsters are in turn pivotally mounted in swinging bolsters or frames 5, by means of shafts or rods 6. The bolsters or frames 5 are in turn pivotally connected with the frames 1 by rods or shafts 7. Thus the series of wheels supporting each of the end frames 1 upon its track are adapted to take and conform to vertical curves or irregularities in the trackways.

The embodied form of driving mechanism for the wheels 2 is designed to drive the wheels together when the machine is traveled by traction, while permitting the free vertical swinging movement desirable or necessary for vertical curves or like variations in the track. In the embodied form of such drive, there is fixed to the shafts of each pair of wheels 2 sprocket wheels 9, over which sprocket wheels runs a sprocket chain 10. To drive one group of two wheels mounted in their individual bolster from another group of two wheels so mounted, there are provided, fixed to the shafts of the respective wheels 2, sprocket wheels 11 over which run a sprocket chain 12, which sprocket chains 12 have sufficient slack to allow for the relative movement of one wheel bolster with respect to another.

Driving means for the series of wheels are shown in the above form adapted to travel the device by the traction of the wheels upon the track, and as embodied, a sprocket wheel 13 is shown engaging one of the sprocket chains 10. Fixed on the shaft of the sprocket wheel 13 is a worm wheel 14, meshing with a worm 15, which worm is upon a vertically arranged shaft 16, said shaft extending upwardly and connecting with a suitable source of power later to be described.

In the embodied form of mechanism for transferring the carriage from one trackway to another, means are provided for traveling the carriage endwise along the inter-communicating cross track by means of the power upon the carriage itself. In such embodied form also, there is incorporated as one feature of the invention, means for lifting the frame 1, so that the flanges of the wheels 2 will be lifted clear of the rails 1, the entire structure then being traveled along the cross or inter-communicating trackway and when in line with the desired trackway, the entire structure is again lowered with the wheels 2 upon the corresponding tracks 1. In the embodied form of such means, each of the frames 1 has near either end thereof a wheel 17, the wheels 17 being separated apart the distance of the gage of the cross or intercommunicating trackway 18. Wheels 17 are also preferably double flanged. These wheels 17 are fixed to a shaft 19, said shaft 19 having thereon a beveled gear 20, intermeshing with a bevel gear 21 upon a vertically arranged shaft 22, which shaft is carried upon the frame 1. Fixed upon the shaft 22 is a gear or worm wheel 23 driven from a motor 24. The foregoing is applied to each of the end frames.

For the purpose of raising and lowering wheels 17, said wheels together with their shaft 19, are carried in vertically movable frames 25 mounted upon the frame 1 at either end of the machine. The frames 25 are raised and lowered vertically by means of screw shafts having beveled gears 26, said gears intermeshing respectively with bevel gears 27, fixed upon respective shafts 28. The shafts 28 are driven respectively through a worm drive 29 from a shaft 30. Wheels 31 are located upon the opposite side of the respective frames 1 from the traction wheel 17, and are likewise adapted to run upon the inter-communicating track 18. Wheels 31 may also be driven if desired.

When it is desired to lower the wheels 17 and 31, the shafts 28 are rotated, and the frames 25 are depressed with respect to their frames 1. When the wheels 17 and 31 rest upon the tracks 18, further relative movement of the frames will lift the wheels 2 until their flanges clear the rails 3, and the entire structure carried by wheels 17 will travel endwise along the cross track 18 until in line with another trackway 3. Thereupon the direction of motion of the shaft 28 will be changed, and the wheels 2 moving downwardly, the frames 1 will rest upon the tracks 3, and the entire structure is in position to move along the trackway.

The tracks in the preferred embodiment, consist of a steel rail with concrete base. Both rail and base will be of a section to suit the wheel pressures and the bearing value of the soil. The rail is cast in the concrete to the lower side of the head of the rail, thereby eliminating any spring in the rail, and at the same time securing same sidewise. Occasional clips to anchor the rail in the concrete are used. This method of track construction, after base line has been run, provides means for accurate track laying without surveying, except in cases of short vertical curves, in which cases the sweep of the vertical curve must be established and the rail bent before concreting. This method provides also for the taking up of the tracks at any time without loss of material or unnecessary labor, the machine itself doing the necessary trenching and lifting of the tracks to be removed. This method is also of advantage in that the track can be constructed and prepared at any convenient time or location.

For practically level farms, the tracks will be preferably of about two hundred feet gage. For a rolling country the gage will be less, preferably about one hundred sixty feet. As the machine has ample traction the matter of reasonable grades is dependent upon providing the necessary power for such grades.

The track comprises a concrete base and preferably a thirty pound rail. The rails are cast in the concrete in forms and the concrete necessarily conforms exactly to the bed of the rail as well as to the contour of the base. Due to this form of construction there will be no spring to the rails and due to the method of securing the rail, maintenance cost is practically eliminated. The tracks are laid by the machine itself, the machine operating on the track as it is laid.

The excavation is done by a suitable trencher operated from a carriage traveling in a horizontal direction on a boom projecting from the front of the machine, the outer end of which can be raised or lowered to suit the grade of the rail. The track sections comprising concrete and rail are carried along by the machine, and are erected by means of a boom, or of sliding carriages on a horizontal boom. This method of operation on fairly level ground eliminates the customary surveying and track gaging. For a rolling location it will be necessary where vertical curves are of short radius to establish the sweep approximately in order to bend rails in advance of concreting. After the track has been laid and the rail joints connected, the machine advances to its new position for setting the next section of track, and at the same time filling in the excavation along side of the tracks by a V-scraper, and the filling being thoroughly pressed into place by rollers, secured to the bolsters of the car. The rollers can be set to give ample pressure and they will operate in pairs.

Transfer tracks for conveying the traveling carriage from one trackway to another, are located at either end of the runs or reaches of the track, and on units or tracts of land relative to which they are located also at intervening points along the reaches of tracks. The runs or reaches of track should be preferably a mile or more long. The space between the transfer tracks will be utilized for roadways, storage pits, etc.

In more detail, in one form of trackway, the rails 3 may be set in concrete bases, as briefly indicated above, and the machine may be utilized to lay its own track. In carrying out the foregoing, track sections, which may be provided by the rail 3 are embedded in a concrete base 32 when the base is cast, which casting may be done upon a casting floor at any desired position and may be contiguous to the trackway. The rail may be embedded to any desired extent in the base 32, and in Figs. 1 and 3 it is shown embedded to the underside of the head. At either side of the rail anchor clips 33 are provided, and they may be staggered and spaced apart as necessary.

In laying the trackway from the machine, booms may be rigged out forward therefrom and a trenching tool employed to run the trenches ahead of the track. Upon the suspended platform 80 may be carried the track sections, and when a rail length has been trenched, a track section is run outwardly and laid in place. As soon as these are secured, the machine may run ahead for the next succeeding rail length. The track sections may be formed with other than concrete bases, so far as concerns many features of the invention.

Referring now to the upwardly extending structure of the end portions of the frame, which are carried upon and extend upwardly from the frame 1 (see especially Figs. 1, 3, 6 and 9), said structures comprise vertical members 50 carried by the frame 1, and shown four in number at each end of the machine and provided with suitable bracing and having main reinforcing or buttressing struts or frame members 51, extending outwardly to the opposite ends of the respective frame members 1.

A suitable structure is provided bridging across from one track to the other, and in said structure there is comprised two trusses extending from the end frame on one track to the end frame on the other track, the end frames serving as the vertical supporting bents for the trusses. Such a structure is shown diagrammatically in Figs. 7 to 11, of the drawings. There is provided a system of lateral bracing in the plane of both the upper chords and the lower chords of the trusses, respectively, (see Figs. 8 and 10). The lower horizontal structure just referred to, in addition to its functions in the general construction, in accordance with certain features of the invention, constitutes a floor or support 52 for the power plant and a portion of the transmission mechanism of the machine. The upper system is indicated by 54 and is shown in Fig. 8. The entire structure is braced and stayed to and from the bottom frames, 1, so as to furnish thereto the necessary stiffness and immobility, while preserving it within practical limits of weight and cost of erection.

Pursuant to those features of the invention whereby the machine travels by traction, a power plant of suitable form is employed. In the embodied form, as already indicated, the horizontal structure 52 is utilized as a floor or support for such a plant. In Figs. 2, 4 and 6 of the drawings, a suitable prime mover, such as an internal combustion engine 60 is provided. Suitable connections from the engine 60 to the drive for the wheels 2 are provided, and in the embodied form is comprised a transmission system including a direction reversing clutch mechanism 61 and 62, between the engine and a differential 63 on a shaft 64. Said shaft 64 extends along the floor 52 from one side of the machine to the other, and at either end said shaft 64 connects by intermeshing bevel gears 65 and 66 with the vertically extending shafts 16, at either end of the machine, respectively. Thus the machine may be run in either direction from the engine 60. It will be understood that other forms of driving mechanism may be employed, so far as concerns most features of the invention, as for example, two electric motors, might be provided at either side, connected together to secure the same number R. P. M. or a gasolene motor could be similarly used, or other suitable driving means, and an air starting and reversing mechanism could be provided.

Supported or suspended from the traveling structure is a platform 80, which platform can be raised and lowered and can also be tilted. In the embodied form of means for effecting the foregoing, the platform 80 is supported from a plurality of cables 81 attached at various points along either side of the platform and extending upwardly to drums 82 supported upon the platform 52. The cables along one side of the platform 80, considered longitudinally thereof, have their winding and releasing drums preferably all connected together, in a suitable manner, as by shafts 83, so that the cables will take up or pay out from the drums together. The drums 80 are driven in a suitable manner, and as embodied, a motor 85 is provided, connected by a pinion 86 to a gear 87 fixed on shaft 88. Meshing with gear 87 is a pinion 89 on a shaft 90. On said shaft 90 is a sprocket wheel 91, with a sprocket chain 92 running thereover and over a sprocket wheel 93, loose on shaft 94. A clutch mechanism 95 is keyed on shaft 94, and may be shifted to clutch either gear 86 or sprocket wheel 93. Shaft 88 connects by worm 97 with shaft 83, and shaft 94 connects by a worm 98 with the other shaft 83. When the clutch 95 is in engagement with gear 86, the drums work together in the same direction to raise or lower the platform 80 level or without turning. When clutch 95 is in engagement with sprocket wheel 93, the drums 82 at either side are run in opposite directions to tilt the platform 80. The motor 85 will be reversible. A shaft 99 may extend from the clutch mechanism 95 to a handle 99$^a$ at the central power station.

The platform 80 is pivoted at either end to cross heads 100, respectively, which cross heads are provided with guide plates 101 adapted to travel vertically on guideways provided by the vertical members 50. Thus the platform 80 may be raised and lowered to various heights and may be tilted in one direction or the other as desired for various purposes, including the discharge of loads carried thereby, and adjusting it to the most efficient angle for pushing or pulling tillage or other implements.

Means are provided by the invention for traveling and operating agricultural implements, that is to provide for draw bar or push bar pull of such implements, either in gangs of the full width of the trackway, or of portions of such full width, all the implements being in a single group or in a plurality of groups across the trackways. In accordance with certain features of the invention further, there are provided, and preferably in connection with the suspended platform, means for sidewise or transverse positioning and moving of agricultural implements sidewise, and the embodied form comprises sliding or spacing members, mounted on and slidable along the edges of the suspended platform, and which may be automatically operated and adjusted or positioned. In addition to such transverse grouping and positioning, the vertical adjustment of such implements may be effected by means of the lifting or lowering of the suspended platform, the platform being tilted by means of attached cables. Means are likewise provided for driving implements requiring it, such as mowing machines or driving disk cultivators, or other machines, the power being derived preferably from the general power unit of the machine. Referring first to the embodied form of such power supplying unit or installation, one of the shafts 16 at one end of the machine is shown of square cross section with a worm or elliptical gear 105 slidable along the shaft. Said gear is carried by brackets 106 and 107, fixed upon the corresponding cross-head 100, the gear 105 thus rotating with the shaft 16, but also moving upwardly and downwardly with the cross head 100, and the suspended platform 80. Meshing with the gear 105 is a worm wheel 108, journaled in the bracket 106, and having a shaft 107 connected to a sprocket wheel 108ª. A sprocket chain 109 runs over sprocket wheel 108 and runs also over a triple sprocket wheel 110 loosely journaled upon a pivot 111, by which pivot the trussed platform 80 is pivotally supported in the cross heads 100. A sprocket chain 112 runs from one of these sprocket wheels 110 over a sprocket wheel 113 fixed to a shaft 114, which shaft extends across the machine along one end of the platform 80. A sprocket chain 115 runs over another of the sprocket wheels 110 and said sprocket chain also runs over a sprocket wheel 116 fixed to a shaft 117. Said shaft 117 extends along or adjacent to the other edge of the platform 80 across the machine. Power for running various agricultural implements may be taken from the shafts 114 and 117 at any point along the platform 80.

The general application of my machine and agricultural system to doing practically all the varied work of an extensive farm, and for widely varied farm work, has been already pointed out in a general way, and it is not deemed essential to amplify in detail the manner of its application to all the operations of farm work. A brief outline will be given, however, of its application, or the preferred form thereof, to some of the principal agricultural operations.

In plowing, four sets of gang plows are used, two sets of right hand on one side of the suspended platform and two sets of left hand on the other side. The plows on one side of the platform are always being carried depending upon the direction of motion of the machine. The pair which is being carried, is reset by the machine operator during their idle travel so that at the end of the run the direction of the travel of the machine is reversed and the idle pair dropped into place just after the working pair has been lifted. The idle pair is lifted and carried by the operation of the overhead hoists. The pairs are operated preferably symmetrically about the center line of the machine, to equalize the traction. This the machine but same is mainly elimination ary dead furrow.

Double disking, harrowing, rolling, clod crushing, and drilling are similar except that the equipment is not operated in pairs, but by means of a fore and aft hitch with a take up for changing from one to the other. In each case some modification of the standard tools is required to suit the operation of the machine but same is mainly elimination and such modifications are simple.

Cultivating differs to the extent that there is a special equipment arranged to operate in either direction with the single hitch and also arranged by means of connections with the suspended platform mechanism, geared proportional to the machine travel, to cultivate both beside and between the plants in the rows without cross cultivation. Handweeding is performed by operators in seats attached to sliding members of the suspended platform chords, thus permitting the operators to sit close to the ground. The hand weeding tool is a revolving bladed cutter with its perimeter guarded and it is operated electrically similar to the small electrical mixers now in use. It is only in the worst cases that hand weeding will be necessary. Under the proper farm management all weeding of this nature, of which there should be little, will be performed by the above electric weeding tool in combination with the cultivator device for cultivating between the plants in the rows. Transplanting is performed automatically by means of the wheel geared mechanism of the suspended platform, the platform carrying the plants and they are transplanted with the original dirt about their roots. Manure is spread by means of toothed drums on either side of the trussed platform, revolved by power. The manure is fed to the spreader by tilting the platform to tip it to the slope required. The capacity additional to the load capacity of the trussed platform is carried either in slings suspended from trolley tracks at the ends of the traveling machine, or on the extension platform and transferred to the platform as required. In the farm management system as laid out, with systematic conjoint raising and grazing of manure producing animals, very little of this operation will be required. Potatoes are planted by potato planters such as now in use. Aside from the preparation of the soil, all of the operations of planting are performed at the same time, namely furrowing, furrow fertilizing, watering, planting, covering and packing of the soil over the furrow. For harvesting potatoes, the standard elevator potato digger is used and is pushed ahead of the suspended platform. The potatoes come up on the elevator grids, and are received by a suitable conveyer, which conveyer delivers them to the carrying bins over the machine bolsters. This location of the bins permits the carrying of large loads directly over the tracks. At the delivery end, the bins on the machine are emptied into the transfer car bins and from thence are transferred to the storage bins by means of the transfer car and the storage bin conveyer. Cabbage is harvested by means of a circular cutter, similar to a saw, which is revolved rapidly by an independent motor equipment. A set of fingers precede the cutter which lift the plants to position so that the cutter can operate at the required portion of the stalk or root. A similar conveying system is used for receiving and distributing or for packing on the suspended platform.

In the transplanting, the plants from the forcing beds with the original dirt unremoved from their roots, are taken up from the nursery green house beds by a special equipment requiring one man, and by means of the same equipment placed on the transplanting flats, ready to be fed automatically to the transplanting equipment. The flats are placed on the suspended platform of the machine, the transplanting feed attached, the geared wheel mechanism set to the proportionate speed required, depending upon what distance apart the plants are to be spaced. The movement of the machine along the track, with the operation of the transplanting equipment, will then furrow, furrow-fertilize, water, transplant, cover as required, and compress the soil as desired, and the suspended platform will carry the supply of plants to be transplanted. At the end of the run the empty transplanting flats are transferred to the transfer car and the loaded flats at the same time loaded on the trussed platform as previously. The transplanting equipment will be further detailed and will require no further adaptation of the machine than as noted.

The hay is mowed with the harvesting or mowing mechanism, elsewhere described omitting the apron used for harvesting grain and which is a simple adaptation, mainly elimination, of the general mowing outfit, to suit the operation of the machine. The teddering is done by the customary equipment similarly adapted. The hay is cured as thoroughly as possible in the field. The gathering of the hay is performed by rake fingers up which the hay slides to the suspended platform, which platform for this operation is carried close to the ground.

On the platform the baling presses receive the hay, bale it, and the bales are removed to be temporarily stored on the extension platform on either end of the machine by means of a conveyer or of the overhead hoists. At the end of the run the hay is tripped to the transfer car and delivered to storage where suitable provision for the completion of the curing is provided. If desired the hay can of course be delivered to the storage by the machine itself, either by means of a conveyer at the storage building or by means of a hatchway in the roof of the building of size sufficient to allow the lowering of the suspended platform down into the building.

Grain is headed by the harvesting mechanism described; the aprons carry the heads to the suspended platform, and by means of a suitable conveyer, preferably mechanical or pneumatic, they are stored on the extension platform at either end of the machine, and from there delivered to storage similarly to hay. Later, in threshing, the heads are delivered to the thresher by means of a pneumatic conveyer, and the chaff removed likewise. The grain is removed by a suitable conveyer to the storage bins. The straw is harvested later, when thoroughly dried, similarly to hay. It will be noted that the straw is of equal lengths. The hog pens are constructed with horizontal overhead members which serve to brace the pen construction and also for the purpose of lifting the pens. The pens are lifted by means of a suitably formed hook bar which will engage by the simple operation of lowering same and which can be disengaged when slightly lowered by means of a tag line. At the same time the pens are moved the feed for the desired period is distributed to the compartments for the desired number of meals together similarly with the required fresh water. It will be noted the operations of disinfecting or sterilizing the hog houses which form a part of the pens can be performed at slight expense rapidly by means of a hinged roof to same. A hog is easily caught from above; a noosed bag or net dropped over the hog to be removed will illustrate a simple means of the removal of any of the drove.

The process of refertilizing the ground is combined with the raising of manure producing animals. Forage crops are planted, such as alfalfa, cavassa, or other crops. If the animals be hogs, they are confined in portable pens which are relatively long and narrow, the pens being portable in the manner indicated. The pens are located to expose an edge of the growing crop along within the pen, so that the hogs will eat the crop cleanly or completely from the edge without trampling or wasting. The pens will be lifted from time to time by the machine and advanced just sufficiently to present an edge of the growing crop within the pen with room for the hogs to stand on the grazed ground and eat the growing crop without trampling. The manure produced from the hogs is received by the ground and the ground is thus directly fertilized from the directly thrown down fecal matter, and its full fertilizing value is thus preserved and absorbed by the ground. There is thus a practically complete absorption of both the liquid and solid parts, the liquid part being practically all lost by the usual manner of handling. Thus the full fertilizing value of the manure is utilized and both the losses and expense of the ordinary manner of handling avoided, while the hogs from the standpoint of rearing, are raised very easily and cheaply and advantageously. A house is built at the end of the pen within which the hogs are confined during the moving of the pens and at other times when necessary or convenient. Suitable troughs will be provided in the houses or at other convenient points for feeding of other foods in addition to the growing crop.

Referring now to the particular embodiment of means for spacing apart agricultural implements and moving and positioning them along the suspended platform 80, to which reference has previously been made, trackways are provided along either edge or chord of the platform 80, comprising I-beams 130 fixed to the edges of the platform 80, and a channel beam 131, above and resting upon and extending over the I-beam 130. Shaped to fit over the bottom of the I-beam 130, and to extend upwardly along the outer face thereof and projecting within the reach of channel beam 131, (see especially Figs. 14 and 20), are a plurality of slidable blocks 132. Said blocks or brackets 132 are connected together by a cable 133, which cable extends along the platform 80, and runs over guide rolls 134 at either end of the platform and passing over guide rolls 135 and under guide rolls 136 again along the platform 80 forming preferably an endless belt. The cable or belt 133 may be of link form, or any other suitable form, to have a positive drive from the mechanism just described. Fixed to rotate with each of the respective rollers 135 is a toothed wheel 136$^a$. Over each of the toothed wheels 136$^a$ runs a link belt 137, said belt extending upwardly and running over a toothed wheel 138. The belt 137 runs over rolls 139, 140, thereby forming a loop, in which is carried pulley 142 supporting a weight 141. The toothed wheels 138 are each fixed to rotate with a corresponding gear 143, said gear 143 meshing with a driving pinion 144 of a motor 145. A shaft 146 extends across the machine to communicate the drive of the motor 145 to the similar mechanism on the opposite side. Thus, by driving the motor 145 in either direction, the position of the members 132 along the edge of the platform 80 may be varied as desired.

Referring now to certain illustrated examples of the manner of attaching various agricultural implements, in Figs. 21 and 22 of the drawings is shown the attachment and operation of harvesting or mowing machines. The member 132 (see also Fig. 20) has fixed thereto, and extending outwardly therefrom, bracket plates 160. Pivotally connected to said bracket plates 160 of two of the members 132 are downwardly extending beams 161 (but one being shown in the drawings), which beams have mounted between them a mowing blade 163, of usual shape or form. The mechanism may be run from either of the shafts 114 or 117, but in the embodied form I have preferred to show an independent motor 164 mounted upon one of the beams or members 161 for driving the cutter knife. A shaft 165 extends from the motor downwardly to the knife operating mechanism 166. Means are provided also for conveying the cut grain heads, or other crop, up on to the platform 80, and for this purpose there is shown in the embodied form a worm 167, fixed on the shaft 165, and meshing with a worm wheel 168. Fixed on the shaft of worm wheel 168 is a toothed wheel 169, running a link belt or sprocket chain 170. Said link belt or sprocket chain 170 runs over a sprocket wheel 171, and over a sprocket wheel 172, to drive the elevating or delivering apron, which carries the grain heads or other material from the knife 163 up on to the platform 80. The disks 173 run along the ground to keep the knife 163 at the proper height in a well known manner.

In Figs. 23 and 24 is shown an exemplification of the attachment, and the operation of the cultivator to the traveling machine or carriage. The shiftable support 200 is positionable along the guide rail 130 on the edge of the platform 80, similarly to the members 132. Supported in the members 200 is a shaft 204, and loosely mounted on said rod are a series of rods 205 and 206, which carry at their bottom ends the cultivation tools 207. As the machine moves along, the tools 207 break up the soil.

Means are provided for effecting the cultivation between the plants in a row, as well as between the rows. In the embodied form of such means, there is provided a power shaft, which is shaft 117 or one similar thereto. Fixed on and rotatable with shaft 85 is an interrupted gear 201, and in mesh therewith is a straight gear on a rod 202, which rod is slidably supported in a bracket 203 slung from shaft 117. The rod 202 is pivotally connected to a collar 208 slidable along rod 205. Pivotally connected to collar 208 is a bar 209, which bar is also pivotally connected to a collar 210, fixed along the rod 206. A spring 211 draws the collar 208 downwardly on rod 205. Means for applying weight to the tools 207 is provided, shown as a bar or bars 212, which is held in position on rods 213 adjustably fastened to the rods 205 and 206. A slot 214 is formed in the bar 212 to permit of lateral movement of rods 206.

The manner of operation is as follows:— A group of gear teeth on wheel 201 engaging the teeth on rods 202 draws the rod to the left in Figs. 23 and 24, thereby drawing collar 208 upwardly, and link 209 thereby moves rod 206 away from rod 205, and the cultivator tools 207 are moved apart to pass a plant. As a group of teeth on wheel 201 pass out of mesh with the teeth on rod 202, spring 211 draws rod 202 and collar 208 to the right and the cultivator tools 207 are drawn nearer together again in position to cultivate between successive plants in a row. The cultivation is thus around each individual plant.

Means are provided to adjust or regulate the mechanism for cultivating between the plants in a row for different spacings apart of the plants in the row. As embodied, and shown in Fig. 24 a plurality of wheels 201 are grouped together and are selectively slidable along shaft 117 to bring any desired one of the wheels into mesh with rod 202. A longitudinally slidable rod 220, operated or set manually, has a yoked end 221 engaging one of the wheels 201 to bring any desired wheel into mesh with the teeth on rod 202. The various wheels 201 have the separated groups of teeth on their peripheries differently spaced apart, thus causing a more or less frequent approaching and receding movement of the cultivator tools 207 to correspond to the spacings of the plants in the rows. The amount of the approaching and receding movement between the cultivator tools may be regulated by moving the pivotal connection of rod 202 to various points along link 209. A link 222 is pivotally connected to collar 208 and to a disk 223 fixed on shaft 204. Other disks 223 may be arranged along shaft 204 as desired, to transmit movement to other cultivator tools from a given set of rods 202 and coöperating gears 201.

The use of various independent motors upon the machines has been described, as one of the features of the invention, and accordingly as embodied, the electrical power for driving such motors is generated upon the machine itself. For this purpose there is provided in the illustrated embodiment a generator 180, which may be driven by a belt 181 from a fly wheel 182 on the shaft of the motor 60, and there may be suitable wiring batteries, secondary batteries, etc., as required, in a manner which will be well understood.

The machine may also be made for watering, spraying, sterilizing and similar purposes. In the embodied form there are shown tanks 185 carried upon the upper part of the structure, and by reason of their height alone having considerable head or pressure for the various operations. If desired, the tanks may be supplied or connected with devices for putting air pressure or other pressure thereupon, and may be supplied with automatic or mechanically driven stirring devices of any known or suitable form (not shown) for use when a spray or sterilizing fluid is used. With the elevated tanks, the device may be used either for spraying small crops or for spraying orchard trees. There are also provided tanks or bins for liquids or dry materials, 186 located directly over the wheel frames and over the tracks, whereby the load is carried in a direct line above the tracks.

Means are provided in addition to the foregoing for raising and lowering loads to or from the floor or platform 80 or to and from the platform 152. In the embodied form of such means, trolleys 190 are fitted to run in ways 192, formed conveniently of an I-beam, along the outer edges or chords of the horizontal platform 152, said trolleys being provided with blocks 191, which may also carry a winding motor or be connected to a winding motor, suitably located upon the structure. These hoists and their guide ways are mounted at or near the outboard part of the floor 52, and thus may lower or hoist loads to or from below past the platform 80, and thus raise or lower material from platform 80 to places therebeneath or at a lower level. A guideway 192 is arranged along beneath the central part of the floor 52 (Fig. 6) and a series of hoists thereby provided centrally over the platform 80.

The purpose or scope and function of the machine, and especially in connection with the layout of tracks over the tillable tract or area is practically universal this machine superseding the use upon the land of all draft animals, and reducing very greatly the number of laborers required. The use of the device in the preparation of the soil by transporting and spreading fertilizers; plowing, harrowing, and otherwise treating and preparing it, will be obvious from what has already been stated. The machine will also sow seed of all kinds, and will also plant and transplant growing plants, cultivate the plants, water and sterilize them by spraying, and will perform the gathering and harvesting, all being done rapidly and automatically.

In addition to the practically universal application of my invention to all kinds and diversities of agricultural operations, a further object thereof is to provide a capacity of meeting the greatest practical or actual variations in the amount of work to be done at a given time, and that without dependence upon a supply of human labor being available to be drawn upon. The greater part of success and profit in farming is dependent upon capacity or ability to do a relatively very large part of the year's most important work rapidly and punctually in conjunction with certain favorable conditions of soil and weather, which conditions are usually of exceedingly short duration. The present invention provides means for the timely meeting of these peak loads of farm work which occur at planting time, harvesting time, and similar junctures, and for meeting them without being dependent upon a large factor of increase in human labor, which is usually lacking when most needed. This reserve capacity in the machine and system of my invention is secured without expenditure for maintenance or any additional expense over the capital charges for the cost of the machine.

In doing the various kinds of work, the floor or platform 80 will serve as a depository for material to be supplied to the land, or which may be derived from the land, and will provide plenty of working space for operatives, and likewise transport all materials to and fro between the buildings or other depots to all parts of the land. An auxiliary transfer or transporting car may be provided, having its own motive power, to run between the machine and the buildings, to save the time of the machine and prevent interruption of its work. The machine may likewise be used in connection with orchard work, in preparing the land for trees, in setting out and transplanting trees, and in spraying them as required. Also the hand picking of fruit may be accomplished with extraordinary rapidity, the pickers being supported on platforms slung or suspended from the machine and being able to pass rapidly around the trees and from one tree to the other and to be raised or lowered by the machine, the machine passing over the trees, and the fruit being carried or conveyed to and deposited upon the platform 80, and carried into storage by the machine. The use of the machine in cultivating, and in spraying all kinds of crops, and in harvesting one of two intergrowing crops will also be clear, as will be the use of the machine in the transportation and the spreading of fertilizer.

In Fig. 26 is shown a diagrammatic layout for a tract with buildings located centrally thereon and being of such height that the machine will pass thereover, the buildings being separated or open to permit the passage of the trackway. The buildings may have cellar room if desired and elevators, which may be raised to bring them level with the suspended platform 80 or the platform 80 can be lowered into the cellars. In the illustrated diagram the buildings a, b, and c are centrally located and a cross track 18 is at one side of the buildings and extending entirely across the various trackways 3. A short cross track 18 is shown at the other end or side of the buildings. Cross tracks are also shown at the outer ends of the various trackways, so that the machine may go out along one trackway, and come back along another working the ground or performing other work while traveling in each direction.

The farm buildings are located along transfer tracks at one end of single runs of trackway, or along midway transfer tracks for double runs of trackway (this latter arrangement being shown in the drawings). The farm buildings are preferably one story buildings above grade, of a height to allow clearance for the machine to operate over them when desired, and they can be provided with hatchways in the roof of size sufficient to allow the suspended platform of the machine to be lowered into the buildings if desired. The farm buildings will consist preferably of metal lath on metal studding, covered with screeded concrete on both the interior and exterior wall surfaces, thus providing an air space between the two coatings. The metal lath and metal studding will be dipped in cement grout before using to coat them thoroughly with cement. The frame will consist of structural steel of rafter and post construction. The siding preferably will be built flat on skid platforms on the ground, and erected full length by the machines. The concrete will be distributed by means of a suitable conveyer preferably located on the machine; also, the screeding to the proper thickness will be done by the machine, the screeds traveling on grounds which can be fixed permanently in position for the run of the work.

The buildings will not require floors, in which case, the storage being in bins, racks, and for baled crops, on skids. The bins will be of concrete construction, ventilated at the bottom by means of holes of suitable size, which holes will be covered with suitable mesh in the case of small grain. The V-section under the bins will be closed for any of the sections desired by means of a movable partition, and the drying, curing, sterilizing, or other treatment by air or gas will be accomplished by moderate plenum or vacuum.

A system of conveyers are provided, in accordance with one feature of the invention, for the distribution to the bins of the material to be stored and also for the handling of the contents of the bins, as for inspection or distribution. Perishable vegetables not harvested with roots, or partially maintained by root storage, will be stored on racks, and the contents of such building or such section of the building will be treated in the manner indicated for sterilization and preservation.

By means of the removal of damp infected air, by sterilization, also by the supply of fresh ozonated air of the desired dryness or humidity, and likewise by the maintenance of the proper temperature, the storage of such products can be accomplished under the most favorable conditions at small additional expense. The providing of such storage and maintenance are very desirable and profitable from the marketing standpoint for large production.

In accordance with one feature of the invention, a green house is provided, which preferably will be of portable type. The framing will be suitable to permit of the house being picked up by the machine and carried by the machine to any location desired. This will permit a large portion of the work of the preparation of the ground used for forcing to be done in advance of the machine. This will further permit the forcing of field crops during the fall, winter and spring seasons. The greenhouse will be located over the crops to be thus grown and successively moved to provide a continuous output or supply of plants for transplanting. It will be noted in this connection that the machine being adapted to the most intensive methods of cultivation, such crops can be planted and grown to suit the most economical use of this forcing system. It will be within practicable limits to provide green-house capacity preferably of one hundred-fifty thousand to two hundred thousand square feet, depending upon the cost of construction, amounting to about four acres. This will provide for the growing of the plants required for transplanting and not simply nursery space. This period covers only a small percentage of the available use of the greenhouses, and the further use thereof will be obvious from the foregoing.

For the heating of the portable type of greenhouses, a simple oil burning apparatus requiring little attention will be used. In their fixed positions, heat will be supplied to the greenhouses by the farm plant, and the heating and drainage of the soil will be provided for by heating pipes inside and near the top of larger tile pipe laid under such areas. Benches can be provided but except for special work will not be used. This system will provide for rotation of crops at small expense, the machine performing most of the work of preparation for installation of the heating and drainage system. It is also to be noted that many of the vegetable forcing crops require comparatively low temperatures, and for which little or no heating is required.

I provide by my invention also a self-propelled power tender car or transfer car, already referred to, which is to convey loads to, or receive loads from the machine, and deliver them to storage, thus saving the time of the machine, which is otherwise required for the farm operations proper.

In Fig. 25, is shown a diagram of a portion of the wiring for the system of independent motors which may be used on different parts of the machine for driving cultivating and other tools, for hoisting loads, or other purposes, the motors being driven from the generator 61. The various motors are indicated by M, wired in circuit with the generator and at K, which is preferably a switchboard at the controlling station of the machine is a set of pole-reversing switches to change the direction of drive of the motors M. All other necessary appliances, such as storage batteries, transformers, or other devices, may be supplied as required.

From all the foregoing it will be understood that a machine has been provided embodying and realizing the objects and advantages set forth together with other objects and advantages.

The invention in its broader aspects is not limited to the particular embodiment shown and described, nor to any particular embodiment, but changes may be made therefrom, within the scope of the accompanying claims without departing from the principles of the invention and without sacrificing its chief advantages.

What I claim as my invention and desire to secure by Letters Patent is:—

1. An agricultural machine adapted to run upon tracks disposed over a tract of tillable ground, said machine including in combination a wheel base over one track, a wheel base over another track, a rigid structure connecting said wheel bases, bolsters pivotally connected to said wheel bases, and traction wheels journaled in said bolsters.

2. An agricultural machine adapted to run upon tracks disposed over a tract of tillable ground, said machine including in combination a wheel base over one track, a wheel base over another track, a rigid structure connecting said wheel bases, bolsters pivotally connected to said wheel bases, and traction wheels journaled in said bolsters, a motor, and driving connections from said motor to said traction wheels to drive the wheels while permitting them to move vertically.

3. An agricultural machine adapted to run upon tracks disposed over a tract of tillable ground, said machine including in combination a wheel base over one track, a wheel base over another track, bolsters pivotally connected to said wheel bases, and traction wheels journaled in said bolster, a motor, and driving means comprising rigid connections from said motor to said wheel base, and flexible connections to said wheels.

4. An agricultural machine adapted to run upon tracks disposed over a tract of tillable ground, said machine including in combination a wheel base over one track, a wheel base over another track, bolsters pivotally connected to said wheel bases, traction wheels journaled in said bolsters, a motor, and driving connections from said motor to said traction wheel to drive the wheels while permitting them to move vertically, said driving connections including rigid connections from the motor to the wheel base and flexible connections to the wheels.

5. An agricultural machine adapted to run upon tracks disposed over a tract of tillable ground, said machine including in combination a wheel base over one track, a wheel base over another track, a rigid structure connecting said wheel bases, a bolster intermediately pivotally connected to the wheel base and traction wheels at either side of said pivotal connection.

6. An agricultural machine adapted to run upon tracks disposed over a tract of tillable ground, said machine including in combination a wheel base over one track, a wheel base over another track, bolsters pivotally connected to said wheel bases, traction wheels journaled in said bolsters, a motor, driving connections from said motor to said traction wheels to drive the wheels while permitting them to move vertically, said driving connections including rigid connections from the motor to the wheel base and flexible connections to the wheels, said rigid driving connections including a differential between the two wheel bases.

7. An agricultural machine adapted to run upon tracks disposed over a tract of tillable ground, said machine including in combination a wheel base over one track, a wheel base over another track, a bolster intermediately pivotally connected to each wheel base, other bolsters pivotally connected to said first-mentioned bolster at either side of its pivotal connection, and traction wheels carried by said other bolsters.

8. An agricultural machine adapted to run upon tracks disposed over a tract of tillable ground, said machine including in combination a wheel base over one track, a wheel base over another track, bolsters pivotally connected to said wheel bases, and traction wheels journaled in said bolsters, a motor, and driving means comprising rigid connections from said motor to said wheel base, and flexible connections to said wheels and a differential in said rigid connections.

9. An agricultural machine adapted to run upon tracks disposed over a tract of tillable ground, said machine including in combination a wheel base over one track, a wheel base over another track, a bolster intermediately pivotally connected to each wheel base, other bolsters pivotally connected to said first-mentioned bolster at either side of its pivotal connection, and traction wheels carried by said other bolsters, a motor for driving the wheels of both wheel bases and driving means extending therefrom to the wheels mounted in the various bolsters.

10. An agricultural machine adapted to run upon tracks disposed over a tract of tillable ground, said machine including in combination a wheel base over one track, a wheel base over another track, a bolster intermediately pivotally connected to each wheel base, other bolsters pivotally connected to said first-mentioned bolster at either side of its pivotal connection, and traction wheels carried by said other bolsters, a motor for driving the wheels of both wheel bases and driving means extending therefrom to the wheels mounted in the various bolsters, said driving means including a differential.

11. An agricultural machine adapted to run upon tracks disposed over a tract of tillable ground, said machine including in combination a wheel base over one track, a wheel base over another track, a bolster intermediately pivotally connected to each wheel base, other bolsters pivotally connected to said first-mentioned bolster at either side of its pivotal connection, and traction wheels carried by said other bolsters, a motor for driving the wheels of both wheel bases and driving means extending therefrom to the wheels mounted in the various bolsters, said driving means including rigid driving devices extending to the wheel bases and flexible driving devices extending to the wheels.

12. An agricultural machine adapted to run upon tracks disposed over a tract of tillable ground, said machine including in combination a wheel base over one track, a wheel base over another track, a bolster intermediately pivotally connected to each wheel base, other bolsters pivotally connected to said first mentioned bolster at either side of its pivotal connection, and traction wheels carried by said other bolsters, a motor for driving the wheels of both wheel bases and driving means extending therefrom to the wheels mounted in the various bolsters, said driving means including rigid driving devices extending to the wheel bases and flexible driving devices extending to the wheels, and a differential in said rigid driving connections.

13. An agricultural machine adapted to run upon tracks disposed over a tract of tillable ground, said machine including in combination a longitudinal wheel base extending over a track, a longitudinal wheel base extending over another track, a plurality of traction wheels positively and pivotally connected to each wheel base, a rigid upright fixed to each wheel base and a rigid cross structure fixed to and connecting the uprights and elevated above the wheel bases, a motor mounted upon said cross structure and driving connections therefrom to the wheels of the wheel bases.

14. An agricultural machine adapted to run upon tracks disposed over a tract of tillable ground, said machine including in combination a longitudinal wheel base extending over a track, a longitudinal wheel base extending over another track, bolsters pivotally mounted in said wheel bases, traction wheels carried by said bolsters, a rigid upright fixed to each wheel base and a rigid cross structure fixed to the uprights, a motor mounted upon said cross structure and driving connections therefrom to the wheels of the wheel bases.

15. An agricultural machine adapted to run upon tracks disposed over a tract of tillable ground, said machine including in combination a longitudinal wheel base extending over a track, a longitudinal wheel base extending over another track, bolsters pivotally mounted in said wheel bases, traction wheels carried by said bolsters, a rigid upright fixed to each wheel base and a rigid cross structure fixed to the uprights, a motor mounted upon said cross structure and driving connections therefrom to the wheels of the wheel bases, said driving connections including flexible connections from the wheel bases to the traction wheels.

16. An agricultural machine adapted to run upon tracks disposed over a tract of tillable ground, said machine including in combination a longitudinal wheel base extending over a track, a longitudinal wheel base extending over another track, a plurality of traction wheels pivotally connected to each wheel base, a rigid upright fixed to each wheel base and a rigid cross structure fixed to the uprights, a motor mounted upon said cross structure and driving connections therefrom to the wheels of the wheel bases, said driving connections including shafting extending from the motor along said cross structure toward either side of the machine and a differential in said shafting.

17. An agricultural machine adapted to run upon tracks disposed over a tract of tillable ground, said machine including in combination a longitudinal wheel base extending over a track, a longitudinal wheel base extending over another track, bolsters pivotally mounted in said wheel bases, traction wheels carried by said bolsters, a rigid upright fixed to each wheel base and a rigid cross structure fixed to the uprights, a motor mounted upon said cross structure and driving connections therefrom to the wheels of the wheel bases, said driving connections including flexible connections from the wheel bases to the traction wheels, said driving connections including shafting extending from the motor along said cross structure toward either side of the machine, a differential in said shafting and flexible connections from the shafting to the traction wheels.

18. An agricultural machine adapted to run over parallel tracks disposed over a tract of tillable land and over intercommunicating cross tracks, said machine including in combination driving means, and traction wheels driven thereby for propelling the machine along the various tracks including the cross tracks.

19. An agricultural machine adapted to run over parallel tracks disposed over a tract of tillable land and over intercommunicating cross tracks, said machine including in combination driving means, traction wheels adapted to run on the parallel tracks and wheels adapted to run on the intercommunicating cross tracks to convey the machine from one parallel track-way to another.

20. An agricultural machine adapted to run over parallel tracks disposed over a tract of tillable land and over intercommunicating cross tracks, said machine including in combination driving means, traction wheels adapted to run on the parallel tracks and wheels adapted to run on the intercommunicating cross tracks to convey the machine from one parallel trackway to another and a common motor for all said wheels.

21. An agricultural machine adapted to run over parallel tracks disposed over a tract of tillable land and over intercommunicating cross tracks, said machine including in combination wheels for traveling the machine along the parallel tracks, wheels for traveling the machine along the intercommunicating cross tracks and means for changing the height of said sets of wheels with respect to each other to travel the machine upon the different tracks.

22. An agricultural machine adapted to run over parallel tracks disposed over a tract of tillable land and over intercommunicating cross tracks, said machine including in combination a structure extending across from one of the parallel tracks to the next, wheel bases connected with said cross structure and extending along the tracks, wheels carried by said wheel bases for traveling the machine along said tracks, cross inter-communicating tracks connecting the various parallel tracks, and wheels carried by said wheel bases for traveling the machine along the intercommunicating cross tracks.

23. An agricultural machine adapted to run over parallel tracks disposed over a tract of tillable land and over intercommunicating cross tracks, said machine including in combination driving means, traction wheels adapted to run on the parallel tracks and wheels adapted to run on the intercommunicating cross tracks to convey the machine from one parallel trackway to another, a motor on said structure and driving connections therefrom to the various wheel bases and wheels.

24. An agricultural machine adapted to run over parallel tracks disposed over a tract of tillable land and over intercommunicating cross tracks, said machine including in combination driving means, traction wheels adapted to run on the parallel tracks and wheels adapted to run on the intercommunicating cross tracks to convey the machine from one parallel trackway to another, and means for changing the relative level of the wheels for running on the different tracks.

25. An agricultural machine adapted to run over parallel tracks disposed over a tract of tillable land and over intercommunicating cross tracks said machine including in combination a wheel base over a track, a wheel base over another track, a rigid elevated cross structure connecting said wheel bases, and a connected cross member movable upwardly and downwardly with respect to the remainder of the structure and adapted to bear the work load of the machine.

26. An agricultural machine adapted to run over parallel tracks disposed over a tract of tillable land and over intercommunicating cross tracks, said machine including in combination a wheel base over a track, a wheel base over another track, a rigid elevated cross structure connecting said wheel bases, and a connected cross member tiltable and movable upwardly and downwardly with respect to the remainder of the structure and adapted to bear the work load of the machine.

27. An agricultural machine adapted to run over parallel tracks disposed over a tract of tillable land and over intercommunicating cross tracks, said machine including in combination a wheel base over a track, a wheel base over another track, a rigid elevated cross structure connecting said wheel bases, and a connected crossmember movable upwardly and downwardly with respect to the remainder of the structure and adapted to bear the work load of the machine and connections extending outwardly and downwardly from said movable member for carrying implements of tillage.

28. An agricultural machine adapted to run over parallel tracks disposed over a tract of tillable land and over intercommunicating cross tracks, said machine including in combination a wheel base over a track, a wheel base over another track, a rigid elevated cross structure connecting said wheel bases, and a connected cross member tiltable and movable upwardly and downwardly with respect to the remainder of the structure and adapted to bear the work load of the machine and connections extending outwardly and downwardly from said tiltable and movable cross member for carrying implements of tillage.

29. In combination, a series of parallel trackways disposed over a tract of tillable land, a carriage traveling along said tracks and adapted to propel implements of tillage, and means for transferring said carriage from one trackway to another and a motor for driving and transferring the carriage.

30. In combination, a series of parallel trackways disposed over a tract of tillable land, a carriage having tractive engagement with said tracks and adapted to propel implements of tillage and means for transferring said carriage from one trackway to another and a motor for driving and transferring the carriage.

31. In combination, a series of parallel trackways disposed over a tract of tillable land, a carriage spanning the space between two adjacent tracks and having wheels running upon the tracks, said carriage being adapted to propel implements of tillage along between said tracks and a cross trackway at the end of a series of said parallel trackways for transferring the carriage from one parallel trackway to another and a motor for driving and transferring the carriage.

32. In combination, a series of parallel trackways disposed over a tract of tillable land, a carriage spanning the space between two adjacent tracks and having wheels running upon the tracks, said carriage being adapted to propel implements of tillage along between said tracks and a cross trackway at the end of a series of said parallel trackways for transferring the carriage from one parallel trackway to another and a motor for driving said carriage by tractive engagement with said tracks and for transferring the carriage from one trackway to another.

33. In combination, a series of parallel trackways disposed over a tract of tillable land, a carriage spanning the space between two adjacent tracks and having wheels running upon the tracks, said carriage being adapted to propel implements for tillage along between said tracks and a cross trackway at the end of a series of said parallel trackways for transferring the carriage endwise from one parallel trackway to another, and a motor for driving said carriage by tractive engagement with said tracks and for transferring the carriage from one trackway to another.

34. In combination, a series of parallel trackways, disposed over a tract of tillable land, a carriage traveling along said tracks and adapted to propel implements of tillage and means for transferring said carriage endwise from one trackway to another and a motor for driving and transferring the carriage.

In testimony whereof, I have signed my name to this specification, in the presence of two subscribing witnesses.

THEODORE P. PAYNE.

Witnesses:
 JOHN D. MORGAN,
 LOUISA LOEHR.